(12) United States Patent
Gyllenram et al.

(10) Patent No.: US 12,314,448 B2
(45) Date of Patent: May 27, 2025

(54) AUTOMOTIVE DATA SHARING AND CONSENT MANAGEMENT PLATFORM

(71) Applicant: Aiden Automotive Technologies, Inc., San Ramon, CA (US)

(72) Inventors: Niclas Gyllenram, Palo Alto, CA (US); Jonas Fenn, San Francisco, CA (US); Syed Mubeen Saifullah, San Ramon, CA (US)

(73) Assignee: Aiden Automotive Technologies, Inc., San Ramon, CA (US)

( * ) Notice: Subject to any disclaimer, the term of this patent is extended or adjusted under 35 U.S.C. 154(b) by 387 days.

(21) Appl. No.: 17/401,406

(22) Filed: Aug. 13, 2021

(65) Prior Publication Data
US 2022/0050925 A1 Feb. 17, 2022

Related U.S. Application Data

(60) Provisional application No. 63/065,559, filed on Aug. 14, 2020, provisional application No. 63/163,154, filed on Mar. 19, 2021.

(51) Int. Cl.
*G06F 21/62* (2013.01)
*G06F 9/54* (2006.01)
*G06Q 50/18* (2012.01)

(52) U.S. Cl.
CPC .......... *G06F 21/6263* (2013.01); *G06F 9/547* (2013.01); *G06F 21/6245* (2013.01); *G06Q 50/18* (2013.01)

(58) Field of Classification Search
CPC ...... G06F 21/60; G06F 21/62; G06F 21/6218; G06F 21/6245; G06F 21/6263;
(Continued)

(56) References Cited

U.S. PATENT DOCUMENTS 10,203,699 B1 * 2/2019 Kim .................. H04W 12/08
10,395,058 B1 * 8/2019 Kothavale ......... G06F 16/24573
(Continued)

FOREIGN PATENT DOCUMENTS

JP 2001076035 A 3/2001
WO WO-2020205514 A1 * 10/2020 ............ G06F 21/33

OTHER PUBLICATIONS

Jan. 5, 2022 International Search Report issued in corresponding PCT Application No. PCT/US21/45861.
(Continued)

*Primary Examiner* — D'Arcy Winston Straub
(74) *Attorney, Agent, or Firm* — Clements Bernard Walker; Christopher L. Bernard

(57) ABSTRACT

An automotive (or other vehicle) data sharing platform, utilizing and including: a data aggregation cloud system configured to receive input data from a plurality of vehicles running data collection software operating on a common operating system, aggregate the input data, and provide output data associated with the input data to one or more entities utilizing a common application programming interface. The automotive data sharing platform enables the distribution of consent queries from the one or more entities, through the data aggregation cloud system, to selected of the plurality of vehicles that, when accepted enable distribution of the output data to the one or more entities.

19 Claims, 13 Drawing Sheets

(58) Field of Classification Search
CPC .. G06F 9/46; G06F 9/54; G06F 9/547; G06Q 50/10; G06Q 50/18
See application file for complete search history.

(56) References Cited

U.S. PATENT DOCUMENTS

| | | |
|---|---|---|
| 11,397,823 B1* | 7/2022 | Argenti .................. G06Q 30/01 |
| 2009/0150023 A1 | 6/2009 | Grau et al. |
| 2010/0185656 A1* | 7/2010 | Pollard ................... G06F 21/31 |
| | | 707/769 |
| 2012/0173051 A1* | 7/2012 | Tarnutzer .......... H04L 12/40006 |
| | | 701/1 |
| 2013/0279695 A1 | 10/2013 | Rubin et al. |
| 2018/0103022 A1 | 4/2018 | Tokunaga et al. |
| 2018/0218548 A1* | 8/2018 | Smith ..................... H04W 4/60 |
| 2019/0130765 A1 | 5/2019 | Tulpule et al. |
| 2020/0126324 A1 | 4/2020 | Hutchins et al. |
| 2020/0151360 A1* | 5/2020 | Zavesky ............. G06F 21/6218 |
| 2021/0173954 A1* | 6/2021 | Hoffen ................ H04W 12/084 |
| 2021/0357528 A1* | 11/2021 | Cropp ................... G06Q 30/02 |
| 2021/0359835 A1* | 11/2021 | Winstrom ............ H04L 63/068 |

OTHER PUBLICATIONS

Notice of Reasons for Rejection issued in corresponding JP Application No. 2023-509746.
European Search Report issued in corresponding EP Application No. 21856759.2.
Kong et al., Privacy-Preserving Continuous Data Collection for Predictive Maintenance in Vehicular Fog-Cloud, IEEE, vol. 22, No. 8, Aug. 12, 2020, pp. 5060-5070.

* cited by examiner

AUTOMOTIVE DATA SHARING AND CONSENT MANAGEMENT PLATFORM

CROSS-REFERENCE TO RELATED APPLICATIONS

The present disclosure claims the benefit of priority of co-pending U.S. Provisional Patent Application No. 63/065,559, filed on Aug. 14, 2020, and entitled "AUTOMOTIVE DATA SHARING PLATFORM" and U.S. Provisional Patent Application No. 63/163,154, filed on Mar. 19, 2021, and entitled "AUTOMOTIVE INTELLIGENT DATA ENABLEMENT AND CONSENT MANAGEMENT," the contents of both of which are incorporated in full by reference herein.

TECHNICAL FIELD

The present disclosure relates generally to the automotive, operating system (OS), data sharing, and consent management fields. More particularly, the present disclosure relates to an automotive data sharing and consent management platform utilizing the Android (Google LLC) OS or the like.

BACKGROUND

Every year, more than 35 million cars and trucks are sold as fleet vehicles. Fleet owners require data from these fleet vehicles to manage their fleets effectively. The fleet management solutions industry is worth more than $40 billion per year. In addition, many fleets are made up of fleet vehicles from multiple original equipment manufacturers (OEMs). Similarly, insurance companies require data from their insured vehicles in order to understand how they are used to minimize their risks and optimize their costs and revenue. The global automotive insurance industry is worth more than $1 trillion per year. Similarly, smart cities, mapping services, emergency service providers, health care workers, and traffic control systems require data from vehicles for planning and response, representing a massive growth industry.

To date, the automotive industry is very fragmented, with most OEMs individually controlling less than 5% of the market. These OEMs do not have native advanced telematics capabilities and have not implemented a common OS (even across models, in some cases), which has led to the creation of a multi-billion-dollar third-party fleet management industry, providing hardware and software for data collection and sharing. Most OEMs now see the value in this market as it has become more relevant to their core business in a world of changing mobility.

Recently, the Android OS has been making inroads into the automotive field, potentially covering an estimated 100 million vehicles by 2025. While current automotive data is fragmented, non-standardized, proprietary, low resolution, not real-time, and not accessible, the Android OS provides the opportunity for a potential solution.

Further, obtaining data from vehicles often requires obtaining informed operator consent to access and gather such data, on either a permanent or limited basis. For example, some vehicle operators may not want to universally grant access to all interested entities (i.e., data consumers) that may want to access the data from their vehicles, and different interested entities may require access to different types of data. Such individualized consent for each data consumer may be difficult to obtain without a streamlined system and method, and challenging for each vehicle operator to assess and manage. Further, it is difficult for the data consumer and/or owner to revise such consent. Similarly, it is difficult for OEMs to control and manage consent authorities and data sharing permissions between vehicle operators and data consumers.

The present background relating to automotive data sharing and consent management is merely intended to provide a contextual overview of some current issues in the field and is not intended to be exhaustive. Other contexts and areas of applicability for the concepts of the present disclosure may become apparent to those of ordinary skill in the art upon review of the following description of illustrative embodiments, and all are contemplated by the present disclosure.

SUMMARY

The present disclosure generally provides an automotive data sharing platform configured to manage consents by vehicle operators, data consumers, and/or OEMs allowing data consumers to access raw, order, encrypted, anonymized, etc. vehicle data, including which and for how long specific data is collectable and used by the data consumers.

In one illustrative embodiment, the present disclosure provides an automotive data sharing system, including: a data aggregation cloud system configured to receive input data from a plurality of vehicles running data collection software operating on a common operating system, aggregate the input data, and provide output data associated with the input data to one or more entities utilizing a common application programming interface.

In another illustrative embodiment, the present disclosure provides an automotive data sharing method, including: receiving input data from a plurality of vehicles running data collection software operating on a common operating system; aggregating the input data in a data aggregation cloud system; and providing output data associated with input data to one or more entities utilizing a common application programming interface.

In a further illustrative embodiment, the present disclosure provides a non-transitory computer-readable medium stored in a memory and executed by a processor to carry out the automotive data sharing steps, including: receiving input data from a plurality of vehicles running data collection software operating on a common operating system; aggregating the input data in a data aggregation cloud system; and providing output data associated with input data to one or more entities utilizing a common application programming interface.

In a further illustrative embodiment, the present disclosure provides a method for obtaining consent to access data collected from a vehicle. The method includes generating a consent form based on inputs received from a data consumer. The method also includes obtaining a list of one or more vehicles to send the consent form to. The method further includes sending the consent form to each of the one or more vehicles. The method still further includes receiving a response from the vehicle including one of an acceptance, a rejection, and a limitation of the consent to access the data collected from the vehicle. In some embodiments, the method still further includes sending a request to an OEM to allow or reject access to data the data consumer is requesting access to. In some embodiments, the method also includes facilitating communication between the OEM and the data consumer.

In a further illustrative embodiment, the present disclosure provides a method for obtaining consent at a vehicle to access data collected therefrom. The method includes receiving, at the vehicle, a consent form from a cloud system identifying a data consumer and the data that the data consumer is requesting access to and for what duration. The method also includes presenting the consent form to an operator. The method further includes receiving a selection for the consent from the operator, the selection being one of giving or denying consent for the data consumer to access the data from the vehicle. The method still further includes sending the response of the operator to the cloud-based system. In some embodiments, the method still further includes receiving, at the vehicle, commands and user interface notifications from each of the data consumers that have been given consent to access the data, the commands and user interface notifications allowing the operator to grant access for the data consumers to remotely control aspects of the vehicle and to facilitate a two-way communication between the data consumers and the operator. In some embodiments, the method also includes, at the vehicle, compressing and arranging the data such that each data element is securely transmitted from the vehicle to a sharing platform. The sharing platform is configured to securely disseminate that data element to multiple data consumers that have obtained consent for accessing the data element. In embodiments, the vehicle is configured to completely control exactly which data consumers are given access to specific data elements in each transmission.

In a still further illustrative embodiment, the present disclosure provides an automotive data sharing system, including: a data aggregation cloud system including a processor and a memory storing instructions that when executed by the processor cause the processor to receive input data from a plurality of vehicles each running a data collection application operating on a common operating system and provide output data associated with the input data to one or more entities utilizing an application programming interface. Preferably, the common operating system is an Android (Google LLC) operating system. One or more of: the data aggregation cloud system is coupled to each of the plurality of vehicles via a wireless two-way communications link; and the data aggregation cloud system is coupled to each of the one or more entities via a two-way communications link. The data aggregation cloud system is further configured to one or more of: aggregate the input data; sort the input data; secure the input data; anonymize the input data; wash the input data; and synthesize the output data from the input data. The data aggregation cloud system is further configured to: receive a consent form request from an entity of the one or more entities; generate a consent form responsive to the received consent form request; send the consent form to selected of the plurality of vehicles; receive a consent form response from the selected of the plurality of vehicles; provide the output data associated with the input data to the entity in the event that the consent form response is in the affirmative; and decline to receive the input data from the selected of the plurality of vehicles or provide the output data associated with the input data to the entity in the event that the consent form response is in the negative. Optionally, the consent form response includes a duration limitation selected by an operator of the selected of the plurality of vehicles. Optionally, the consent form response includes a data type limitation selected by an operator of the selected of the plurality of vehicles. The data aggregation cloud system is further configured to receive a modified consent form response from the selected of the plurality of vehicles and provide modified output data associated with the input data to the entity corresponding to the modified consent form. The consent form is sent to a user interface of a display of each of the selected of the plurality of vehicles and the consent form response is received from the display of each of the selected of the plurality of vehicles. Optionally, the input data is encrypted by one or more of the plurality of vehicles responsive to a request for encryption by one of the one or more entities such that the input data is not readable by the data aggregation cloud system. The input data is encrypted by the one or more of the plurality of vehicles using a public key received from the one of the one of more entities through the data aggregation cloud system and the associated output data is subsequently decrypted by the one of the one or more entities using a corresponding private key. Optionally, the input data is one or more of event thresholded and periodic based on a request from one of the one or more entities. The data aggregation cloud system is configured to transmit a one or more of a command, a push notification, and a web link from one of the one or more entities to one or more of the plurality of vehicles.

In a still further exemplary embodiment, the present disclosure provides an automotive consent management method, including, in a data aggregation cloud system: receiving a consent form request from an entity of one or more entities; generating a consent form responsive to the received consent form request; sending the consent form to selected of a plurality of vehicles; receiving a consent form response from the selected of the plurality of vehicles; providing output data associated with input data received from the selected of the plurality of vehicles to the entity in the event that the consent form response is in the affirmative; and declining to receive the input data from the selected of the plurality of vehicles or provide the output data associated with the input data received from the selected of the plurality of vehicles to the entity in the event that the consent form response is in the negative. The data aggregation cloud system includes a processor and a memory storing instructions that when executed by the processor cause the processor to receive the input data from the plurality of vehicles each of which are running a data collection application operating on a common operating system and provide the output data associated with the input data to the one or more entities utilizing an application programming interface. One or more of: the data aggregation cloud system is coupled to each of the plurality of vehicles via a wireless two-way communications link; and the data aggregation cloud system is coupled to each of the one or more entities via a two-way communications link. The automotive consent management method of claim 11, further including one or more of: aggregating the input data; sorting the input data; securing the input data; anonymizing the input data; washing the input data; and synthesizing the output data from the input data. Optionally, the consent form response includes a duration limitation selected by an operator of the selected of the plurality of vehicles. Optionally, the consent form response includes a data type limitation selected by an operator of the selected of the plurality of vehicles. The automotive consent management method further includes receiving a modified consent form response from the selected of the plurality of vehicles and providing modified output data associated with the input data to the entity corresponding to the modified consent form. The consent form is sent to a user interface of a display of the selected of the plurality of vehicles and the consent form response is received from the display of the selected of the plurality of vehicles.

In a still further exemplary embodiment, the present disclosure provides a non-transitory computer-readable medium stored as instructions in a memory executed by a processor of a data aggregation cloud system to cause the processor to: receive a consent form request from an entity of one or more entities; generate a consent form responsive to the received consent form request; send the consent form to selected of a plurality of vehicles; receive a consent form response from the selected of the plurality of vehicles; provide output data associated with input data received from the selected of the plurality of vehicles to the entity in the event that the consent form response is in the affirmative; and decline to receive the input data from the selected of the plurality of vehicles or provide the output data associated with the input data received from the selected of the plurality of vehicles to the entity in the event that the consent form response is in the negative. The instructions further cause the processor to receive the input data from the plurality of vehicles each of which are running a data collection application operating on a common operating system and provide the output data associated with the input data to the one or more entities utilizing an application programming interface.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

As alluded to above, fleet management is currently dependent upon external hardware and software, which is installed via the on-board diagnostics (OBD) port of a vehicle. The OBD port is standardized for diagnostics and is configured to receive a dongle with a modem, for example. It is generally limited to data collection use by one entity at a time. Otherwise, a more elaborate "upfit" must be provided. The result is a limited set of data that is available to a limited set of users, with poor quality. This is generally a unidirectional interface with limited update capability. Further, for infrastructure developers and managers, accessing data via the OBD port is not a practical option at all.

Conventional fleet management and insurance "plug-ins" that utilize the OBD port or the like include plug in hardware that can be relatively expensive and is typically accompanied by a monthly charge for data collection and storage. The data collected and system functionality typically includes, but is not limited to: basic vehicle status, ignition status, gear selection, wheel ticks, fuel performance, driver rating, vehicle security, temperature, charge, RPM, range, vehicle immobilization, operating cost, repair information, system reporting, HVAC settings and performance, seat positions, lane alerts, service notifications, two-way communication, depreciation, global positioning system (GPS) position and estimated-time-to-arrival (ETA), mobile device key, remote lock/unlock, emergency alerts, geofencing, cellular network conditions, signal strength, WiFi data, accelerometer and gyroscope data, audio and video data, perception sensor data, etc.

Figure 1:
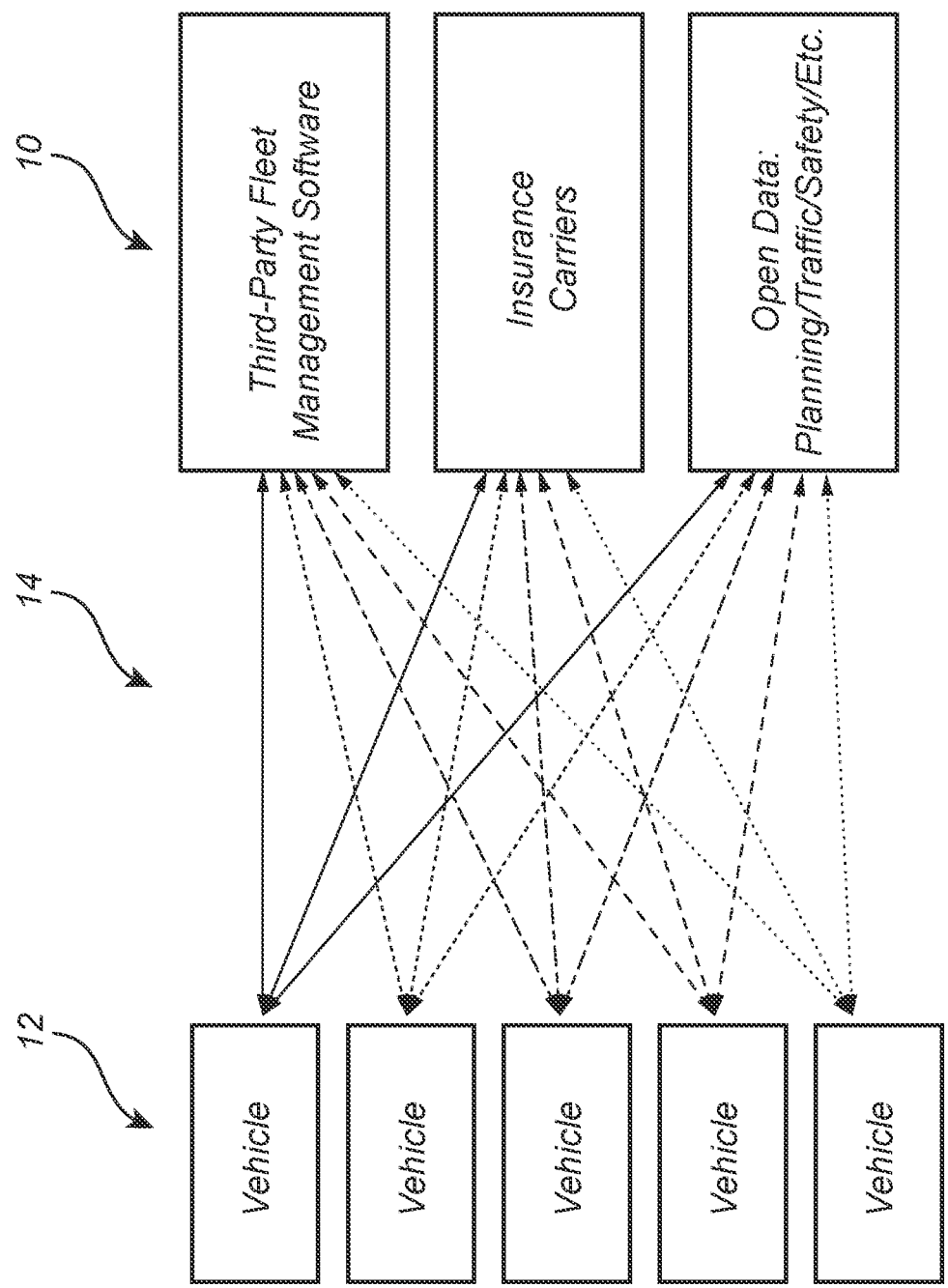
FIG. 1 illustrates different entities needing data connectivity from different OEM vehicles via communication links 14 that are currently custom.

FIG. 1 illustrates the current conundrum, where different entities 10 need data connectivity from different OEM vehicles 12 via communication links 14 that are currently custom.

Figure 2:
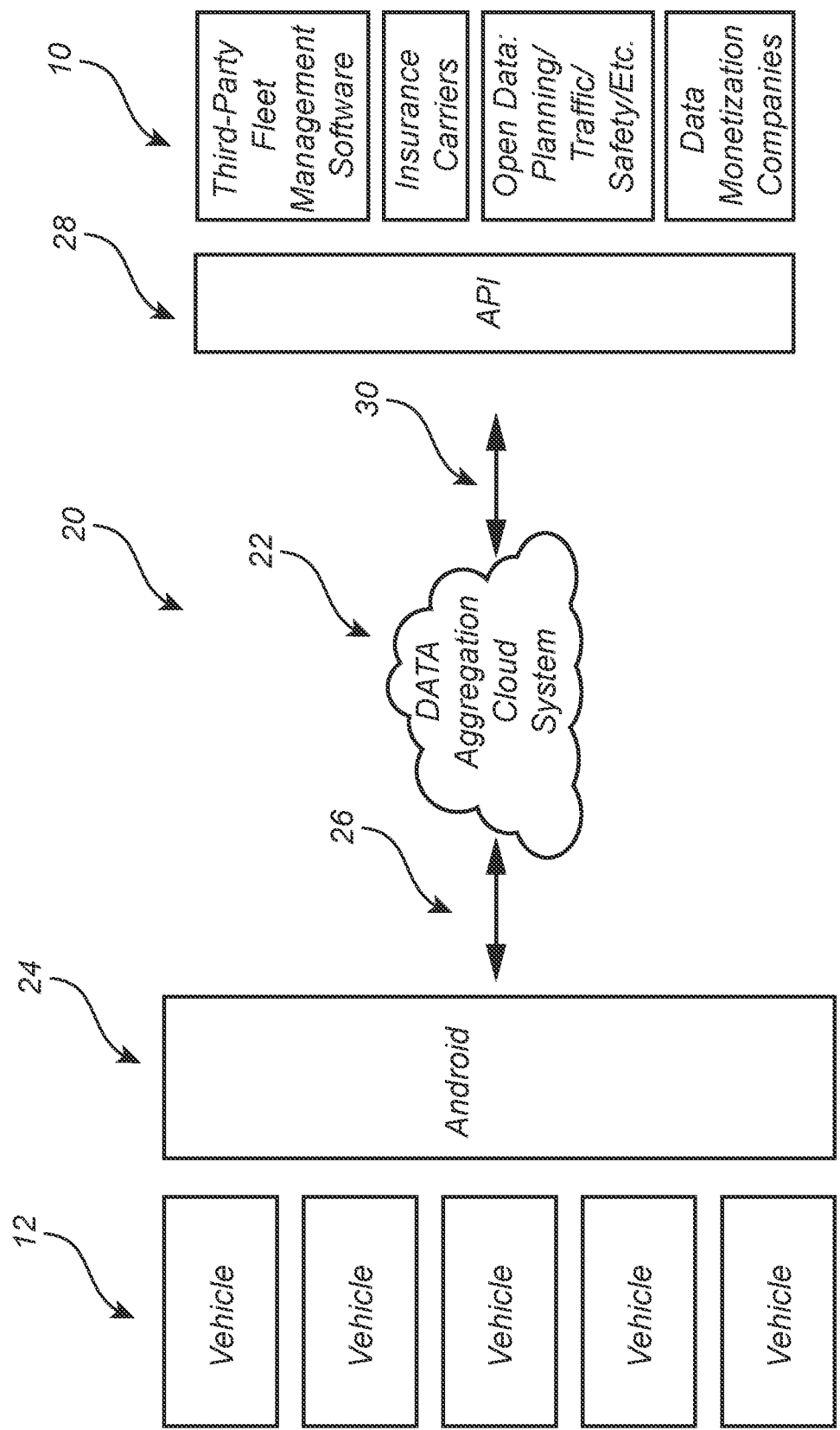
FIG. 2 illustrates one illustrative embodiment of the automotive data sharing platform of the present disclosure.

FIG. 2 illustrates one illustrative embodiment of the automotive data sharing platform 20 of the present disclosure. The automotive data sharing platform 20 includes a data aggregation cloud system 22 that wirelessly gathers data from the OEM vehicles 12 and provides the data to a variety of interested entities 10, again including fleet management companies, insurance companies, infrastructure entities, data monetization companies, etc. Theoretically, these interested entities could include any type of interested entity, without limitation, and the automotive data sharing platform 20 could be used with any type of dispersed vehicle or device. Here, in the automotive case, however, a data link through the OBD port or the like is not used. Rather, each of the OEM vehicles 12 runs common resident data collection software using the Android OS (or the like) 24, providing a standardized interface with the aggregation cloud system 22. Two-way communication is enabled by the use of a wireless two-way communications link 26 through the common data collection software running on the Android OS 24. One the other end, each of the interested entities 10 interacts with the aggregated data cloud system 22 via a standardized application programming interface (API) 28 or the like, again via a wireless two-way communications link 30.

Advantageously, the data collection software in each OEM vehicle 12 can be different, but the Android OS interface 24 to the aggregation cloud system 22 is the same. This provides the desired degree of standardization and eliminates the cumbersome and limiting OBD port dongle and modem, for example. Authentication and security can be handled by the aggregation cloud system 22, as is described in greater detail herein below. Data can be aggregated, anonymized, and washed for different purposes. Importantly, new data can be synthesized, given the aggregated foundation now available. Most importantly, as is described in greater detail herein below, data sharing consents can be delivered, responded to, and otherwise managed at both the vehicle 12 (FIG. 1) and the interested entity (10 (FIG. 1) (via the API 28), as well as at the aggregation cloud system 22. This leads to numerous pendant functionalities, also described in greater detail herein below, that have not been previously available.

General data, functions, and features now available due to the use of the aggregation cloud system 22 include, but are not limited to: vehicle status, asset management, driver behavior, real-time telematics, data caching, privacy and encryption, standardized API access, multiple customer access, occupant data, driver identification (ID), open data sharing, two-way vehicle communications, predictive maintenance, intelligent charging (electric vehicles), expansion and integration, theft protection/immobilization, arrival updates, consent delivery/response/management, etc. Thus, richer data is provided in real time with a standard software interface, decreasing hardware and telematics costs.

At the outset, it is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 3:
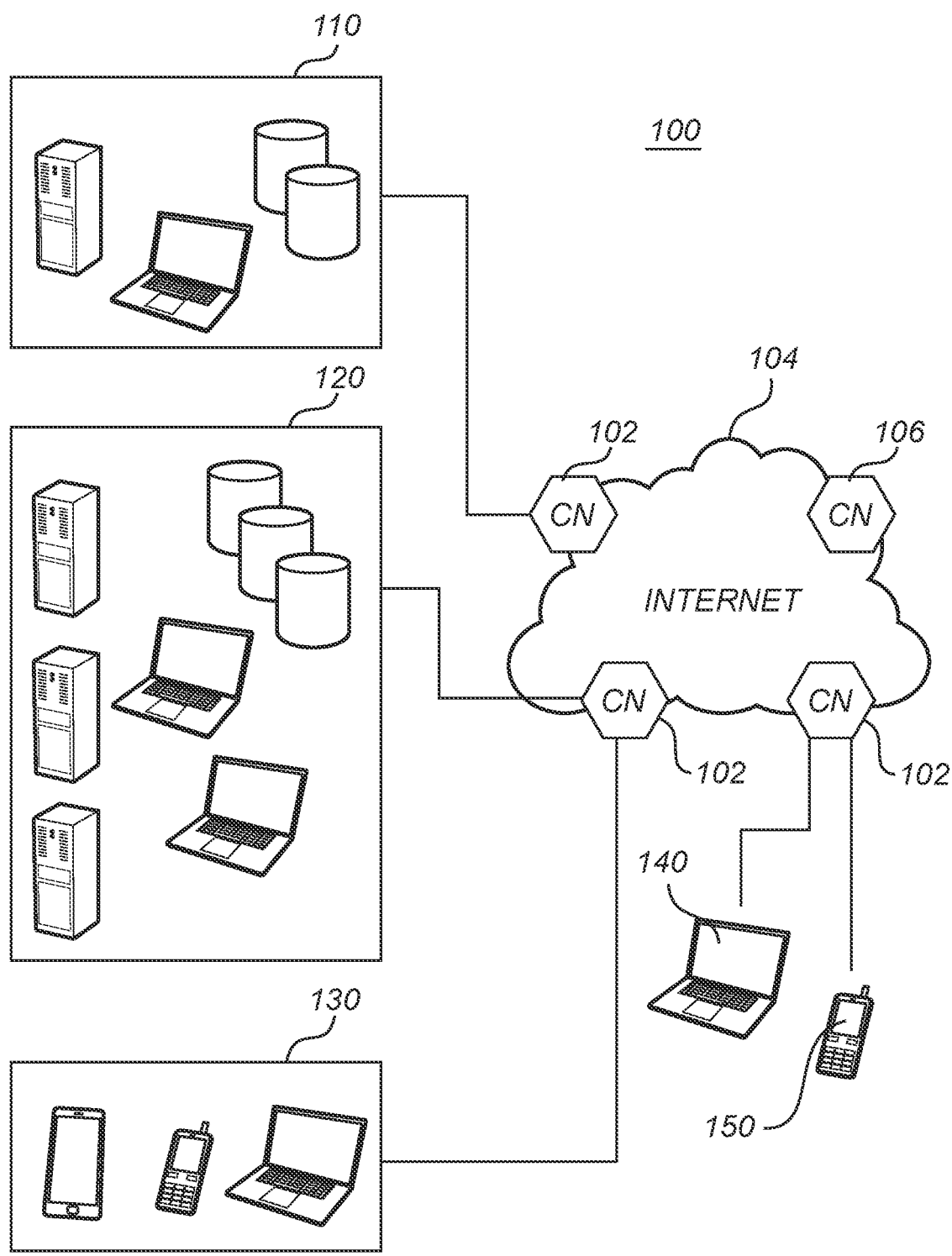
FIG. 3 is a network diagram of a cloud-based environment for implementing various cloud-based services of the present disclosure.
Figure 4:
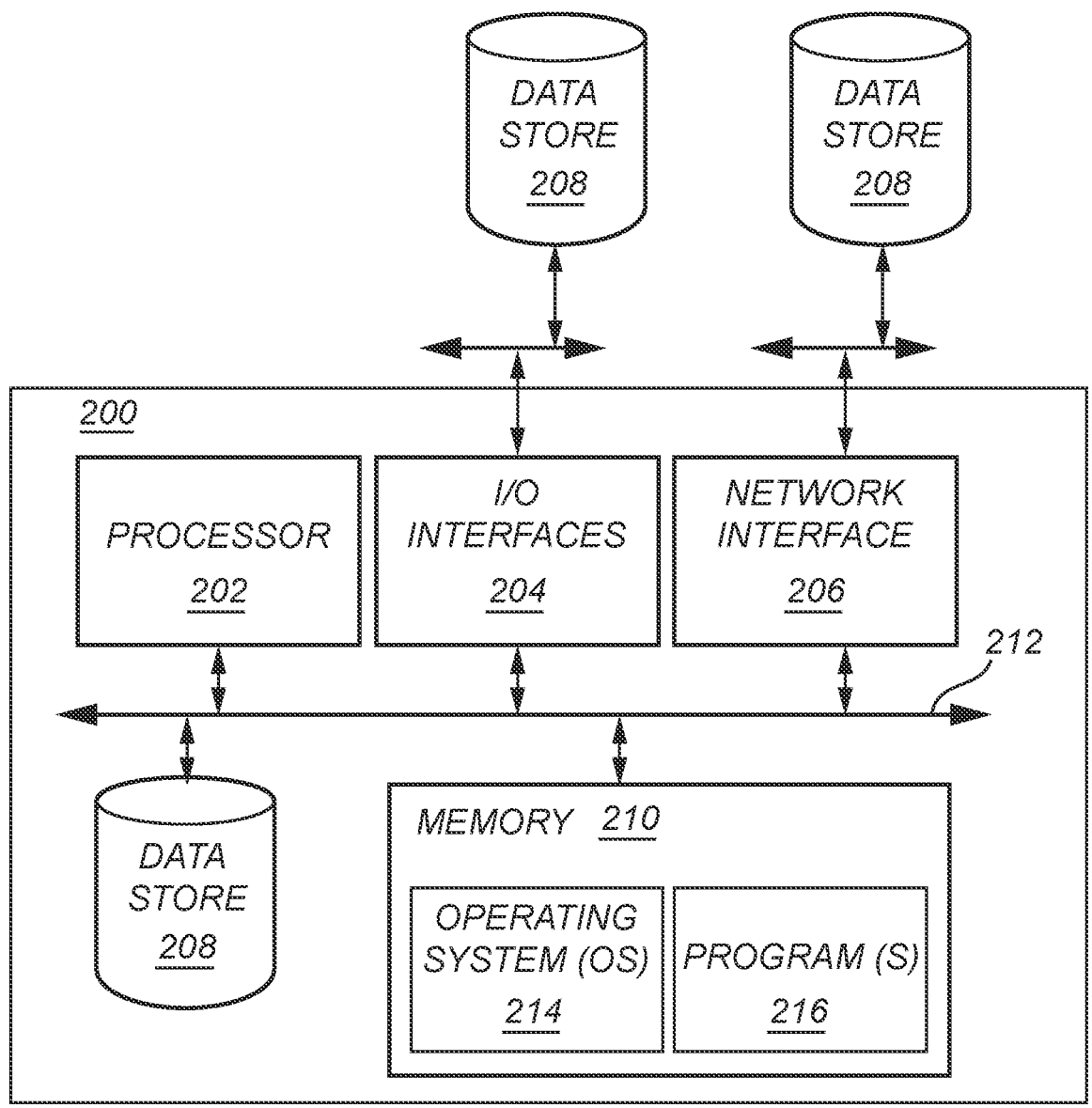
FIG. 4 is a block diagram of a server that may be used stand-alone, in a networked environment, or in the cloud-based system of FIG. 3.

FIG. 3 is a network diagram of a cloud-based system 100 for implementing the various cloud-based services of the present disclosure. The cloud-based system 100 includes one or more cloud nodes (CNs) 102 communicatively coupled to the Internet 104 or the like. The cloud nodes 102 may be implemented as a server 200 (as illustrated in FIG. 4) or the like and can be geographically diverse from one another, such as located at various data centers around the country or globe. Further, the cloud-based system 100 can include one or more central authority (CA) nodes 106, which similarly can be implemented as the server 200 and be connected to the CNs 102. For illustration purposes, the cloud-based system 100 can connect to a regional office 110, headquarters 120, various employee's homes 130, laptops/desktops 140, and mobile devices 150, each of which can be communicatively coupled to one of the CNs 102. These locations 110, 120, and 130, and devices 140 and 150 are shown for illustrative purposes, and those skilled in the art will recognize there are various access scenarios to the cloud-based system 100, all of which are contemplated herein. The devices 140 and 150 can be so-called road warriors, i.e., users off-site, on-the-road, etc. The cloud-based system 100 can be a private cloud, a public cloud, a combination of a private cloud and a public cloud (hybrid cloud), or the like.

The cloud-based system 100 can provide any functionality through services such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 110, 120, and 130 and devices 140 and 150. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application necessarily required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein are not necessarily limited thereby.

FIG. 4 is a block diagram of a server 200, which may be used in the cloud-based system 100 (FIG. 3), in other networked systems, or stand-alone. For example, the CNs 102 (FIG. 3) and the central authority nodes 106 (FIG. 3) may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104 (FIG. 3). The network interface 206 may include, for example, an Ethernet card or adapter (e.g., 10BaseT, Fast Ethernet, Gigabit Ethernet, or 10GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., a SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (OS) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 5:
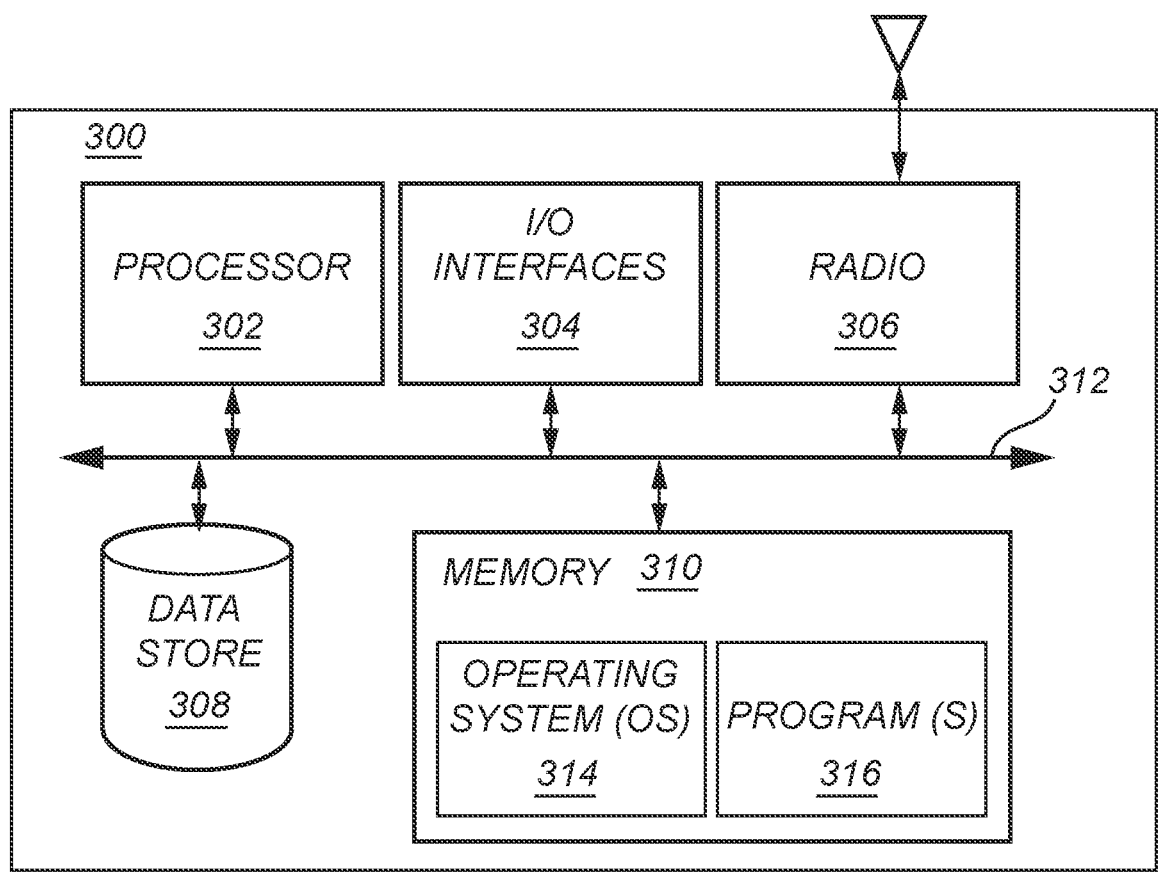
FIG. 5 is a block diagram of a user device that may be used in a connected environment or the cloud-based system of FIG. 3.

FIG. 5 is a block diagram of a user device 300, which may be used in the cloud-based system 100 (FIG. 3) or the like. Again, the user device 300 can be, in this case, a vehicle, a smartphone, a tablet, a smartwatch, an Internet of Things (IoT) device, a laptop, a virtual reality (VR) headset, etc. The user device 300 can be a digital device that, in terms of hardware architecture, generally includes a processor 302, I/O interfaces 304, a radio 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but is not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 306 enables wireless communication to an external access device or network. Any number of suitable wireless data communication protocols, techniques, or methodologies can be supported by the radio 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

Again, the memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 5, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide operator functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100 (FIG. 3).

Figure 6:
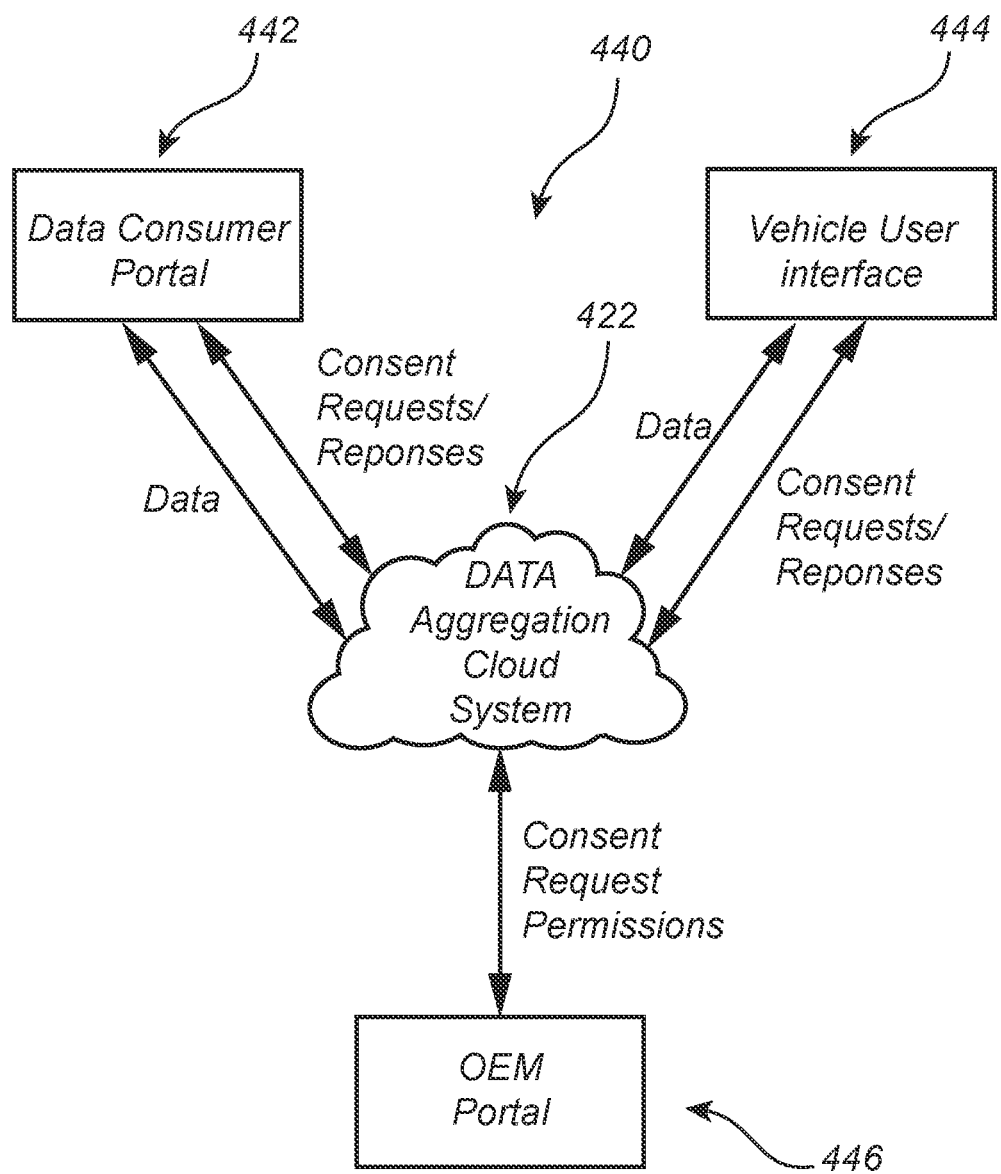
FIG. 6 is schematic diagram of one illustrative embodiment of the consent management system of the present disclosure, which may be implemented using the automotive data sharing platform of FIG. 2 or otherwise.

FIG. 6 is schematic diagram of one illustrative embodiment of the consent management system 440 of the present disclosure, which may be implemented using the automotive data sharing platform 20 of FIG. 2 or otherwise. Generally, the consent management system 440 is used by interested entities 10 (FIGS. 1 and 2) to send consent requests to vehicles 12 (FIGS. 1 and 2) or the like to subsequently collect data from the vehicles, as provided above, by the link enabled by the coupling OS 24 (FIG. 2) or the like. The consent management system 440 is also used by operators of the vehicles 12 to accept, reject, and/or limit such consent requests. This consent management process enables many pendant functionalities, described in greater detail herein below. Non-limiting examples of data that may subsequently be provided by the vehicles 12 to the interested entities include, but are not limited to, basic vehicle status, ignition status, gear selection, wheel ticks, fuel performance, driver rating, vehicle security, temperature, charge, RPM, range, vehicle immobilization, operating cost, repair information, system reporting, HVAC settings and performance, seat positions, lane alerts, service notifications, two-way communication, depreciation, GPS position and ETA, mobile device key, remote lock/unlock, emergency alerts, geofencing, cellular network conditions, signal strength, WiFi data, accelerometer and gyroscope data, audio and video data, perception sensor data, etc. The consent management system 440 is further used by OEMS grant various levels of consent request and data sharing permissions to interested entities 10 and vehicles 12, for example. Again, all of these interactions occur through the data aggregation cloud system 422, which is managed by a data aggregation and consent management provider who, as provided above, may also grant various levels of consent request and data sharing permissions to the interested entities 10 and vehicles 12, may organize, anonymize, encrypt, or otherwise reformulate the shared data, and provide many other advantageous functionalities to the interested entities 10, vehicles 12, and OEMs, as described in greater detail herein below.

As illustrated, the interested entities 10 each interact with the data aggregation cloud system 422 and consent management system 440 via a data consumer portal 442 that typically consists of a web page or application executed on the display of a fixed or mobile processing device connected to the Internet or the like. Likewise, the data aggregation cloud system 422 and consent management system 440 interact with the operators of each of the vehicles 12 via a vehicle user interface 444 disposed in each vehicle 12 that typically consists of a touchscreen display, display and joystick, or the like. Such vehicle user interface 444 is well known to those of ordinary skill in the art and is typically user by a vehicle operator to interact with the operational status, climate, audio, navigation, and other systems of the vehicle. Further, the OEMs each interact with the data aggregation cloud system 422 and consent management system 440 via an OEM portal 446 that typically consists of another web page or application executed on the display of a fixed or mobile processing device connected to the Internet or the like. At the center of the system 422 is a provider portal that allows a provider to manage all the functionalities of the system 422. Various of the portals may show data being transferred to/from the cloud in real time.

Referring again to FIG. 2, the automotive data sharing platform 20 of the present disclosure includes the data aggregation cloud system 22 that, with consent, gathers data from the vehicles 12 and provides the data to a variety of interested entities 10, again including fleet management companies, insurance companies, infrastructure entities, data monetization companies, etc. Each of the vehicles 12 runs common resident data collection software using the Android OS 24 or the like, providing a standardized interface with the aggregation cloud system 22. Two-way communication is enabled by the use of the two-way communications link 26 through the common data collection software running on the Android OS 24 or the like. One the other end, each of the interested entities 10 interacts with the aggregated data cloud system 22 via the standardized API 28 or the like, again via the two-way communications link 30.

Advantageously, the data collection software in each OEM vehicle 12 can be different, but the Android interface 24 to the aggregation cloud 22 is the same. This provides the desired degree of standardization and eliminates the cumbersome and limiting OBD port dongle and modem, for example. Authentication and security can be handled by the aggregation cloud system 22. Data can be aggregated, anonymized, and washed for different purposes. Importantly, new data can be synthesized, given the aggregated foundation now available.

Data, functions, and features now available due to the use of the aggregation cloud system 22 include, but are not limited to: vehicle status, asset management, vehicle commands, driver behavior, real-time telematics, data caching, privacy and encryption, standardized API access, multiple customer access, occupant data, driver ID, open data sharing, two-way vehicle communications, predictive maintenance, intelligent charging (for electric vehicles), expansion and integration, theft protection/immobilization, arrival updates, etc. This richer data is provided in real time with a standard software interface, decreasing hardware and telematics costs. Data transmitted from vehicle to cloud to data consumer may be anonymized by, for example, removing identifiers, keeping a location domain where applicable, and widening a time domain where applicable, with a same timestamp provided. Thus, a given data point will become one of many in an area over a time period, for example, such that it is not individually identifiable, directionality cannot be assessed, etc. In this manner, the given data point is anonymized.

Again, the automotive data sharing platform 20 gathers data from the vehicles 12, such as from onboard processors of the vehicles 12, and provides the data to a variety of interested entities 10 (i.e., data consumers) via the data aggregation cloud system 22. The data gathered from the vehicles 12 includes data related to one or more of satellite navigation system information, such as GPS information, speed, accelerometer, gyroscope, collision warning, Anti-lock Braking System (ABS) information, such as ABS active, traction, gear position, seatbelt usage, parking brake usage, turn signal usage, odometer, engine RPM, Diagnostic Trouble Code (DTC)/Malfunction Indicator Lamp (MIL), battery State of Health (SOH), battery charge, battery charge/discharge rate, tire pressure, oil level, activated hazard lights, and the like, without limitation. In embodiments, the data is gathered by the vehicle pushing the data to the cloud, such as via an application that collects and pushes the data to the cloud. Importantly, the application of the present disclosure allows a data consumer to, in real time (i.e., seconds), request data points from a vehicle according to configured event thresholds and/or on a time frequency basis and/or with or without encryption, send to and obtain from a vehicle operator absolute or conditional consent to receive such data points, and then receive such data points, with or without encryption. Appropriate notifications can be pushed to the vehicle, as can commands, via the two-way communication link. Thus, for example, a data consumer can request and receive timed data points from a vehicle if and when a certain temperature is detected at the vehicle, or another event occurs. This is all centrally configured by the data consumer and appropriate consents are delivered and accepted, with the data flowing subsequently flowing essentially in real time. The types of communications that can be sent via the consent forms include requests to receive data and/or user interface (UI) notifications that include a universal resource locator (URL) or the like that may be opened by the vehicle and displayed to the vehicle operator. Thus, the data consumer may rapidly incorporate independently developed information, notifications, inducements, and the like that are delivered rapidly to one or more vehicles via the app of the present disclosure, with the vehicles then opening the associated URLs when the consents are accepted or otherwise acted upon and data subsequently begins to flow.

Due to privacy and marketing concerns and the like, the automotive data sharing platform 20 and data consumers 10 need to obtain consent from the operators of the vehicles 12 in order to gather, access, share, and analyze the data collected by and from the vehicles 12.

The data sharing platform 20 is configured to facilitate the presentment and obtaining of consents by the data consumers 10 from the operators for the use of the data captured from the vehicles 12. In embodiments, the data sharing platform 20 generates consent forms for the data consumers 10, based on inputs received from the data consumers 10, that are provided to the operators.

Figure 7:
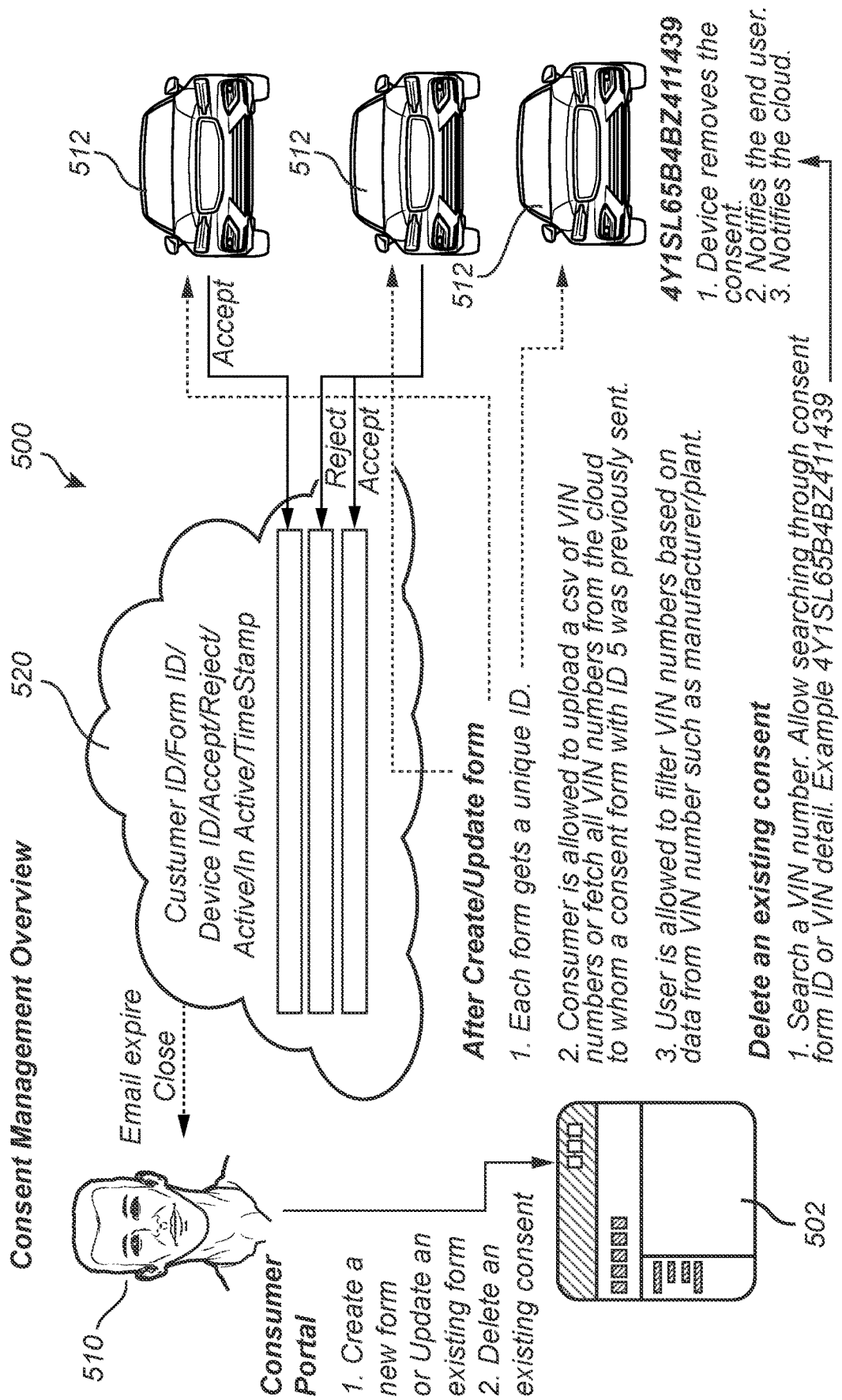
FIG. 7 is a flow diagram overview of the consent management provided by the data sharing platform of the present disclosure.

FIG. 7 is a flow diagram of the consent management process 500 utilized by the data sharing platform 520 in accordance with an exemplary embodiment of the present disclosure. In the embodiment of FIG. 7, the data sharing platform 520 is configured to provide a portal 502 to the data consumers 510 for generating, modifying, and deleting consent forms 520. These consent forms 520 include one or more of a consumer ID identifying the data consumer 510, which information the data consumer 510 will access, a duration identifying how long the consent will remain valid, and a form ID that is a unique identification for each form generated by the data consumer 510. Upon generation of the form, the data consumer 510 identifies which vehicles 512 the form is to be sent to. In embodiments, each vehicle 512 is identified by its unique Vehicle Identification Number (VIN). In embodiments, a Comma Separated Value (CSV) file, or the like, with a list of VINs identifies which vehicles 512 to send the consent form 520 to. In embodiments where a consent form 520 is being modified, the data sharing platform 520 is configured to determine which vehicles 512 previously were sent the modified consent form, such as by accessing a list of vehicles 512 stored thereby. Forms can also be routed by known groupings or classes of vehicles 512 or operators, for example.

The data sharing platform 520 provides the consent form to the operator at the vehicle 512, receives the acceptance/rejection of the consent form, and updates the consent for the specific vehicle 512 based thereon. In embodiments, the consent is updated with a timestamp of when the consent was accepted/rejected. In embodiments, the consent form is provided on a display of the vehicle 512. In other embodiments, the consent form is provided to an associated mobile application executed on a mobile device of the operator. Optionally, the mobile device is coupled to the vehicle 12 via a hard wire or short range wireless communication protocol, such as Bluetooth.

In embodiments, the portal 502 provides information including: consent forms, consents dispatched, notifications received, a VIN search, a data dashboard, and the like. The portal 502 also includes a user interface for uploading a selection of VINs for identifying which vehicles 512 will be sent a given consent form, allows for the uploaded VINs to be filtered by related information, and allows sending the consent forms to the vehicles 512 identified by the VINs uploaded. The consents dispatched information may include a list of all consents dispatched, details inside each consent dispatched, associated VINs, and the status (accepted/rejected/pending/not reached). The notifications may include recent approval status changes, recent reports identifying the data consumer as unknown, a list of consent forms about to expire, and a list of consent forms recently expired. These are illustrative functionalities only.

Figure 8:
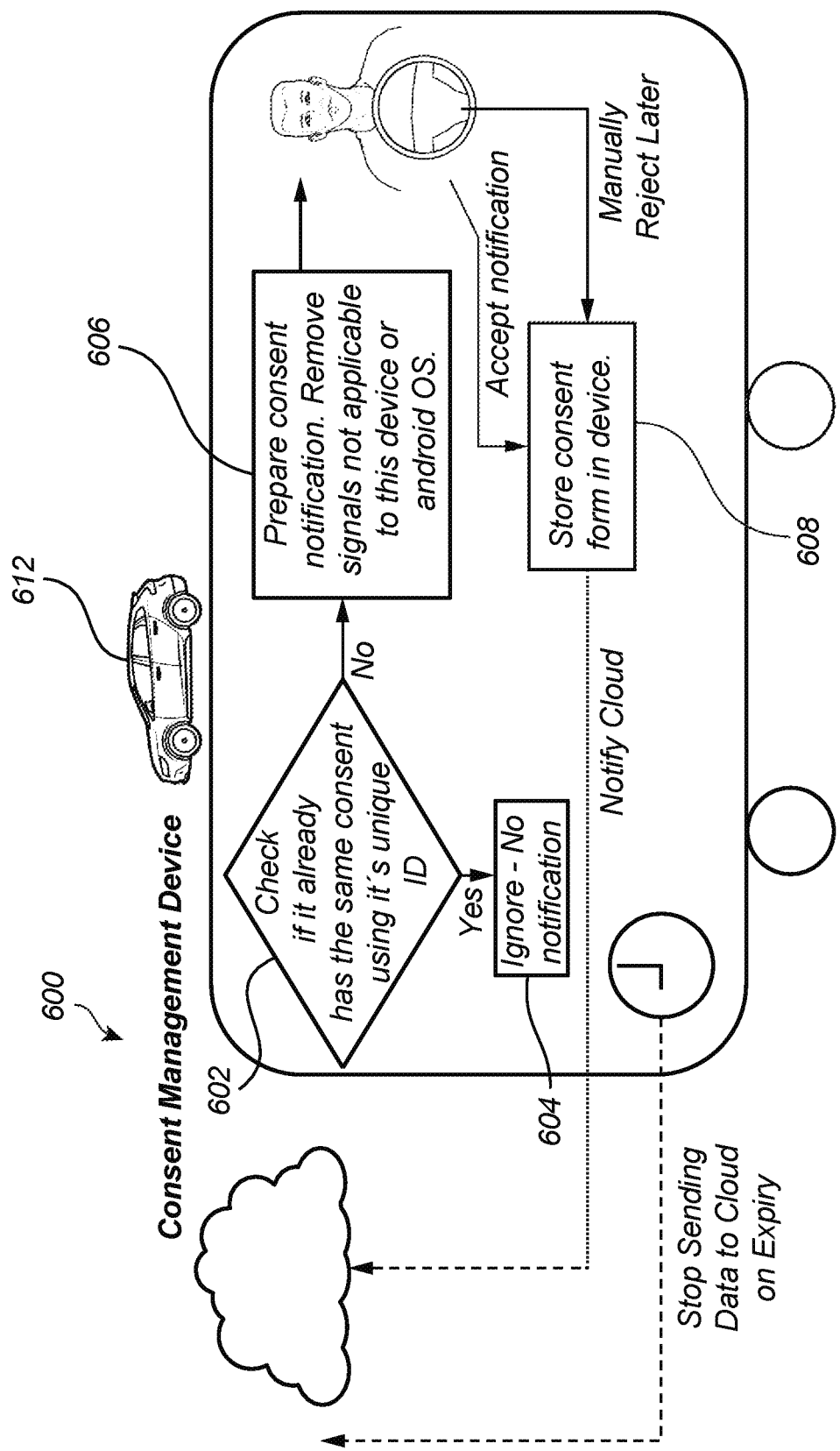
FIG. 8 is a flow diagram illustrating consent management related to an onboard device of an OEM vehicle.

FIG. 8 is a flow diagram illustrating consent management with respect to an onboard device 600 of a vehicle 612. In embodiments, upon receipt of a consent form from a node of the data sharing platform 520 (FIG. 7), the onboard device 600 determines whether the consent form has previously been received. This determination is made by comparing the consent form received to previous consent forms received at 602. In embodiments, the onboard device 600 compares the form ID of the received consent form to form IDs of the previously received consent forms. In response to having previously received the consent form, the onboard device 600 ignores the consent form and does not notify the operator at 604. In response to having not previously received the consent form, the onboard device 600 prepares a consent notification that is displayed to the operator at 606. In embodiments, the onboard device 600 displays the consent notification on a display of the onboard device 600. In other embodiments, the consent notification is sent to a connected mobile application and displayed on the associated mobile device. Upon receipt of an input from the operator to accept/reject/limit the consent, the onboard device 600 stores the consent form thereon and notifies the cloud nodes of the data sharing platform 520 at 608. In response to the operator accepting the consent, the onboard device 600 begins sending the associated data to the cloud on the schedule provided until the consent expires, the consent is revoked by the operator, or the data consumer no longer wishes to access the data.

Figure 9:
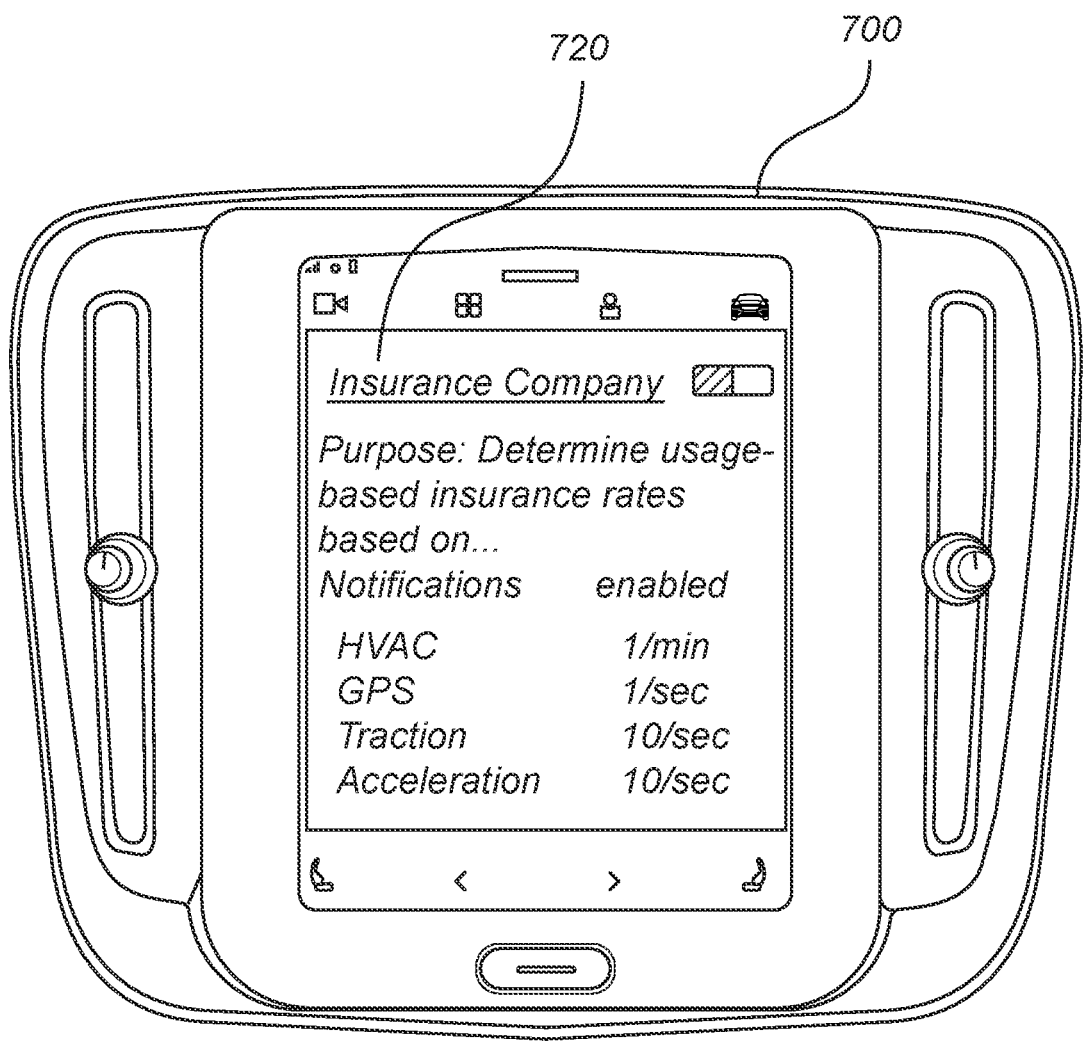
FIG. 9 is an illustrative vehicle display displaying a consent form user interface to an operator.

FIG. 9 is a schematic illustration of a display 700 displaying a consent form user interface 720. In the embodiment shown in FIG. 9, the form displays the data consumer, in this case "Insurance Company," a stated purpose for the consent, and a list of the data that the consent allows the data consumer to access. The form also shows whether consent has been given. In the embodiment illustrated, consent is shown in a toggle that is switched on to illustrate that consent is given and switched off to illustrate that consent is not given. This is by way of example only.

Figure 10:
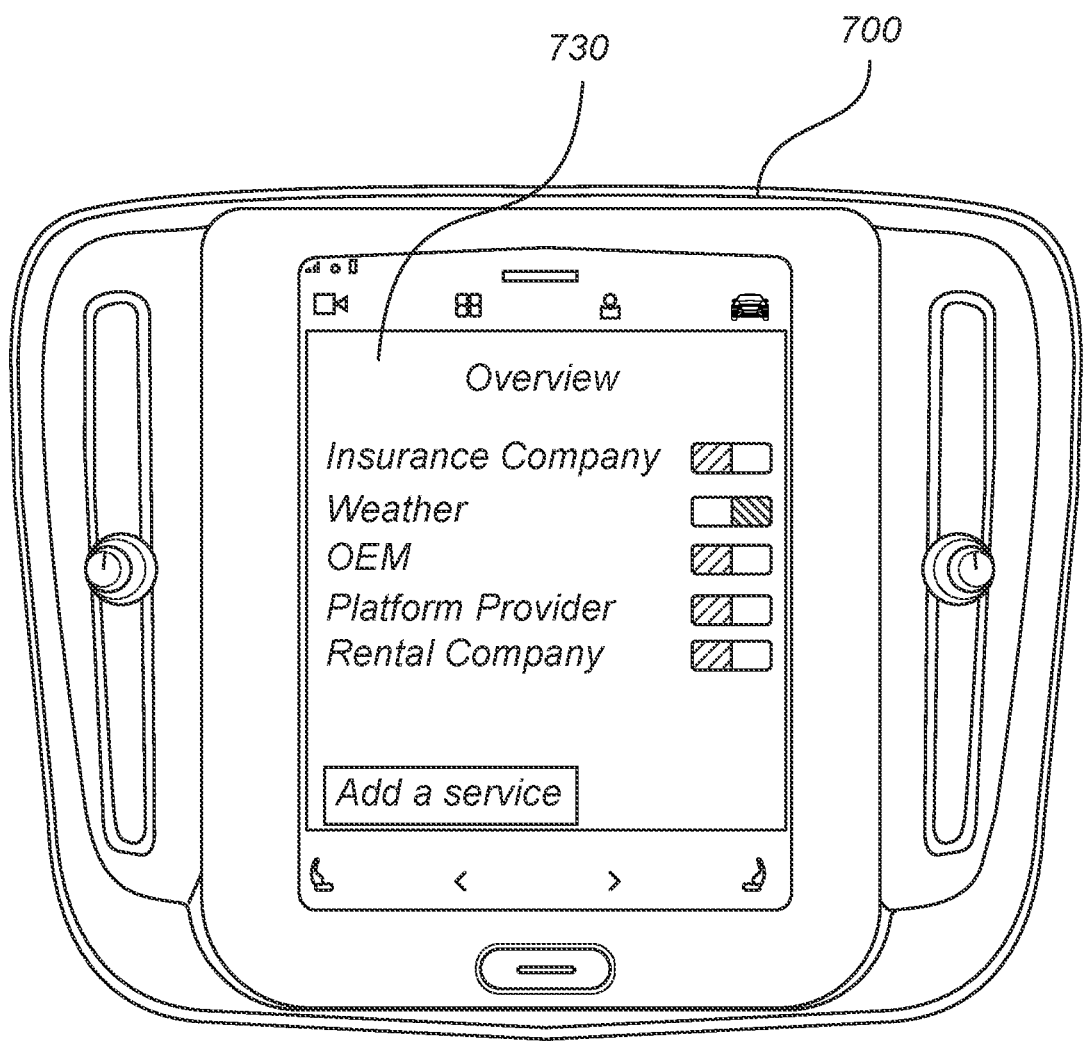
FIG. 10 is an illustrative vehicle display displaying another consent form user interface to an operator.

FIG. 10 is a schematic illustration of a display 700 displaying a consent overview user interface 730. In the consent overview user interface, each of the consents active/requested are displayed with the name of the data consumer along with an indication of whether consent has been given or not. In the embodiment shown in FIG. 10, the indication is shown in a toggle, similar to the toggle described with regard to FIG. 9. While a toggle is illustrated, other forms of indicating whether consent has been given, such as displaying yes or no, highlighted statuses, etc. are also contemplated.

Figure 11:
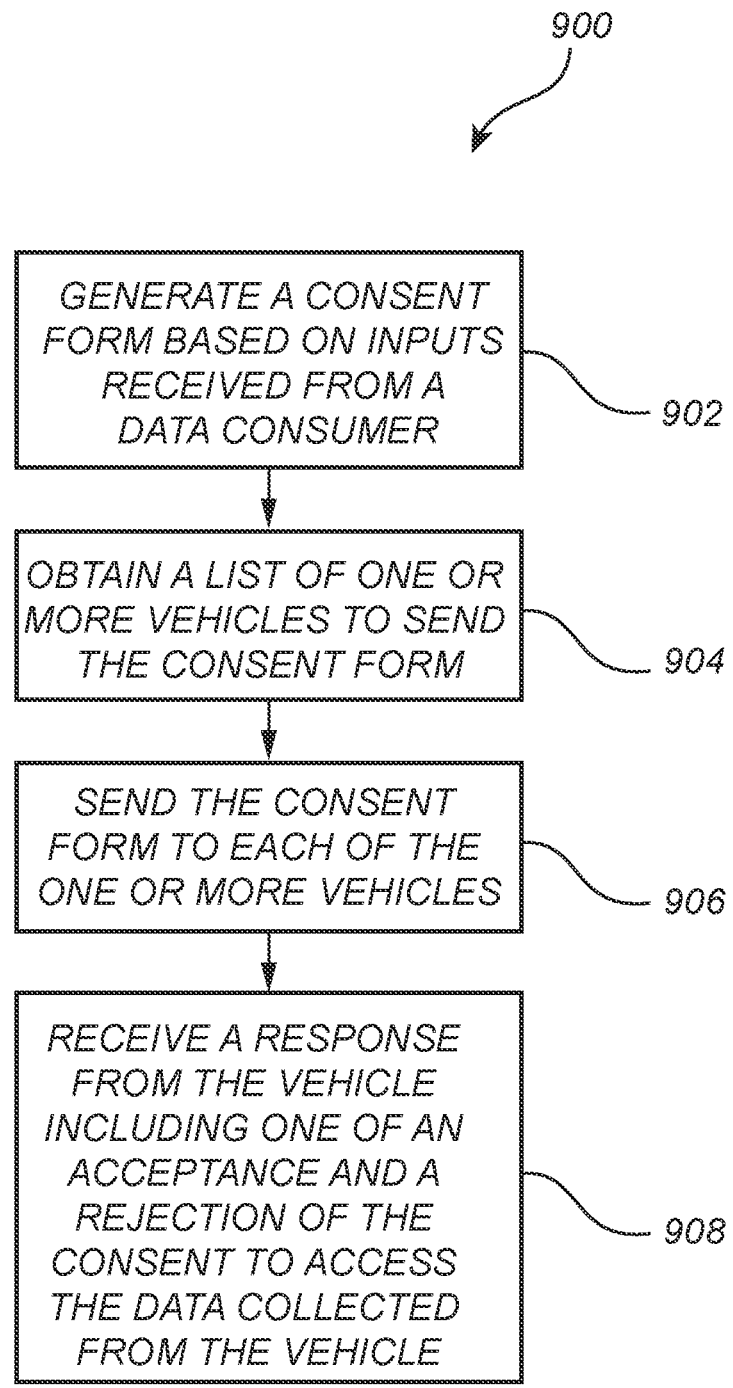
FIG. 11 is a flowchart of one illustrative embodiment of a method for obtaining consent to access data collected from a vehicle in accordance with the present disclosure.

FIG. 11 is a flowchart of a method 900 for obtaining consent to access data collected from a vehicle. The method includes generating a consent form based on inputs received from a data consumer at step 902. In embodiments, the inputs include a selection of which signals the data consumer is requesting access to. In some embodiments, the selection includes identifying which of the requested signals are mandatory for the data consumer to obtain access to. In some embodiments, generating the consent form includes creating a unique ID for the consent form. In further embodiments, the consent form is customizable to include a logo, text, styling, and the like to further identify the data consumer. The consent form may also be configured to receive an expiry date for the consent, the time the data will be accessed/stored, and the like.

The method 900 also includes obtaining a list of one or more vehicles to send the consent form to at step 904. In embodiments, the vehicles are identified by their VIN and the list includes the VIN for each of the vehicles that the data consumer is seeking to obtain consent for. The method 900 further includes sending the consent form to each of the one or more vehicles at step 906. In embodiments, the vehicle includes an onboard computer that receives the consent form, displays the consent form, and obtains a response to the consent requested.

The method 900 yet further includes receiving a response from the vehicle at step 908. In embodiments, the response includes an accept/reject status of the consent, the form ID, the consumer ID, and the like.

In embodiments, the method 900 includes storing a consent record. In some embodiments, the consent record is generated upon generation of the consent form and includes the consumer ID, vehicle identification/device ID, the form ID, any related timestamps, an accept/reject/pending status, an active/inactive status. Prior to receiving a response, the consent may indicate the consent as pending. Upon receipt of the response from the vehicle, the status is updated to one of accepted and rejected.

In embodiments, the method 900 is performed via a portal provided by THE cloud-based system 520 (FIG. 7) and the method 900 includes one or more of updating the consent form and obtaining consent for the updated consent form, filtering data based on VIN of the vehicles, reviewing consent dispatch results (including which vehicles accepted, rejected, reported the data consumer as unknown, have pending results, and could not be reached), seeing consent status, seeing consent history, revoking an existing consent, receiving notification when a consent is reported, receiving notification when a consent expires, and the like.

In embodiments, a particular vehicle may be unreachable, and in response to the vehicle being unreachable, the method includes storing the consent status in the consent record as N/A.

In some embodiments, the method still further includes sending the consent form to an OEM of the vehicle for the OEM to allow or reject access to data the data consumer is requesting to access. In some embodiments, the method also includes facilitating communication between the OEM and the data consumer.

Figure 12:
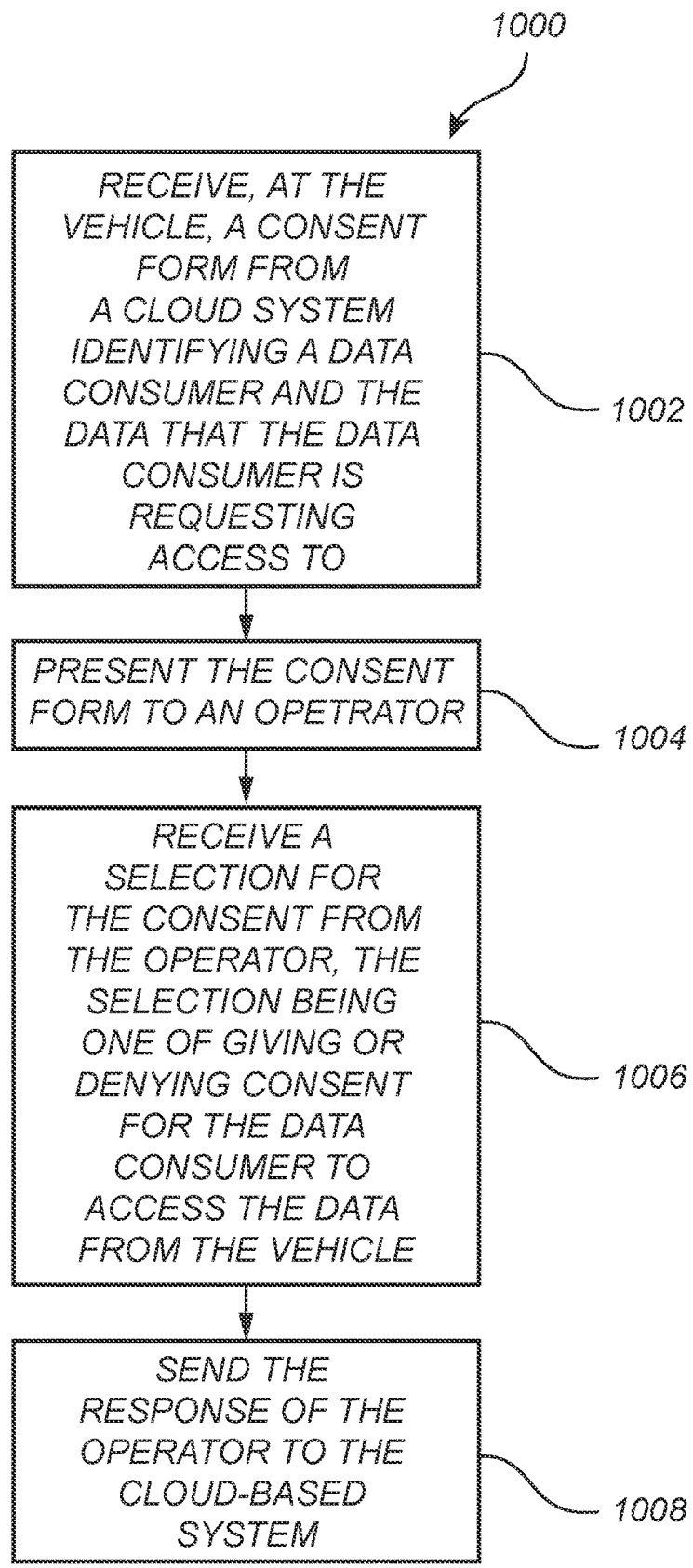
FIG. 12 is another flowchart of one illustrative embodiment of a method for obtaining consent to access data collected from a vehicle in accordance with the present disclosure.

FIG. 12 is a flowchart of a method 1000 for obtaining consent at a vehicle to access data collected therefrom. The method 1000 includes receiving, at the vehicle, a consent form from a cloud system identifying a data consumer and the data that the data consumer is requesting access to at step 1002. The method 1000 also includes presenting the consent form to an operator at step 1004. In embodiments, the operator is the owner/driver of the vehicle. In some embodiments, the consent form is presented via the display 700 (FIGS. 9 and 10). In other embodiments, the consent form is presented via a mobile application on a mobile device that is associated with the vehicle, the mobile application receiving the consent form from the vehicle for display thereof, for example. In some embodiments, the consent form displayed to the operator includes selections to be reminded later and to indicate that the operator does not know the company.

The method 1000 further includes receiving a selection for consent from the operator, the selection being one of giving or denying consent for the data consumer to access the data from the vehicle at step 1006. In some embodiments, receiving a denial for consent includes receiving a reason for the rejection, such as the company being unknown to the operator, the operator does not want to share one or more selected data signals, the expiry of the consent is too long, the time data is stored is too long, and the like.

In some embodiments, in response to a data signal, identified by the data consumer as being mandatory, not being available, the vehicle responds to the cloud that the data is not available rather than presenting the consent form to the operator and receiving a selection for the consent therefrom. In further embodiments, in response to a previously accepted consent form being modified to include a data signal that is not available at the vehicle, the vehicle stops sending data, the previous consent is marked as inactive, and the operator is notified of the change.

The method 1000 yet further includes sending the response of the operator to the cloud-based system at step 1008. The response including the acceptance/rejection, a timestamp, and other related information.

In some embodiments, the method 1000 still further includes receiving a selection to revoke the consent and sending the revocation to the cloud system. In some embodiments, the method further includes storing both the consent form and the response at the vehicle and allow the operator to change the response provided for the consent at any time.

In embodiments, when a new consent form is sent to replace a previous, already accepted, consent form, the previous consent form remains active until the new consent form is responded to, at which time, the new consent form becomes the only valid consent form between the data consumer and the vehicle.

In embodiments, the consent forms are encrypted to maintain a chain of trust between the data consumer and the operator. In some embodiments, each data consumer is assigned a public-private key pair and each vehicle/operator is also assigned a public-private key pair. When a consent form is sent, the consent form is encrypted using the data consumer's private key. The vehicle/operator utilizes the data consumer's public key to encrypt it and also verifies the checksum. Similarly, the vehicle/operator, upon accepting consent, signs with the vehicle/operator private key. An example of this process is as follows. When it is desirable to a data consumer or a vehicle operator that data sent to and through the cloud is encrypted, the data consumer may send its public key through the cloud with the consent form sent to a vehicle. The vehicle ultimately receives this public key and, at the vehicle, encrypts the data to be sent back to and through the cloud after the consent (which notice of privacy measures) is accepted or conditionally accepted. This vehicle-encrypted data is sent back to and through the cloud to the data consumer, as requested, where the data consumer can then decrypt the requested data using the associated private key. In general, data is requested, consents are obtained, and data begins to flow in real time, with only seconds required for each step, even when the data consumer requests encryption for various data points, or the data points are anonymized, etc.

In some embodiments, the data sharing platform utilizes digital watermarking, such as digital steganography, to verify which vehicle is actually sending data, to confirm proper storage periods, and the like.

In some embodiments, the method still further includes receiving, at the vehicle, commands and user interface notifications from each of the data consumers that has been given consent to access the data, the commands and user interface notifications allowing the operator to grant access for the data consumers to remotely control aspects of the vehicle and to facilitate a two-way communication between the data consumers and the operator. In some embodiments, the method also includes, at the vehicle, compressing and arranging the data such that each data element is securely transmitted from the vehicle once to a sharing platform. The data sharing platform is configured to securely disseminate that data element to multiple data consumers that have obtained consent for accessing the data element. In embodiments, the vehicle is configured to completely control exactly which data consumers are given access to specific data elements in each transmission.

In embodiments, the data sharing platform is configured to provide the owner thereof to manage, inspect, and control activities of data consumers, OEMs, and operators on the data sharing platform. In some of these embodiments, the data sharing platform is configured to provide one or more of: a list of registered data consumers; an OEM status of each of the data consumers; consent forms created by created by data consumers; lists of registered OEMs; data consumers approved and disapproved for each OEM; histories of consents accepted by one or more of data consumer, VIN number, and consent form; consents revoked; notifications when a consent is revoked; notifications when a consent is denied because the operator does not know the data consumer; feedback provided from operators; status of the cloud; status of consumer APIs; and access to error and debug logs.

In embodiments, the data sharing platform is also configured to provide a number of data consumers, a number of vehicles connected, and changes over time of such numbers. In some embodiments, the data sharing platform is configured to issue the owner notifications when a data consumer has an abnormal number of rejections or violations. This notification can be triggered by an anomalous number of rejections and/or violations as compared to other data consumers or can be triggered when a predetermined threshold number of rejections and/or violations for the data consumer occurs.

In some embodiments, the data sharing platform is configured to monitor data consumers and to issue notifications to the owner when a data consumer is accessing data that the data consumer does not have permission to access or is utilizing the data sharing platform in an unintended manner. In embodiments, a comparison between data elements that the data consumer has consent to access is compared to the data elements accessed by the data consumer and a notification is issued if the latter includes data elements not included in the former.

Along with detecting anomalous behavior of data consumers, in embodiments, the data sharing platform is configured to detect anomalous data produced by the vehicle to identify rare items, events, or observations which raise suspicions by differing significantly from most of the other data collected by the data sharing platform. For example, a sudden drop in the speed of a vehicle can indicate a possible crash and a drop in fuel tank level or pressure may indicate a fuel leak.

In embodiments, the data sharing platform is configured to alert the owner of the vehicle, such as a rental car company, when a data anomaly has occurred. In other embodiments, the data sharing platform is configured to track data anomalies by VIN of the vehicle and allow the owner to review the data anomalies that have occurred. In embodiments, the data sharing platform is also configured to, based on consents obtained, notify data consumers, OEMs, and the data sharing platform owner when data anomalies occur and provide access to lists of anomalies that have occurred. These lists can be filtered by VIN, OEM, geographical region, and the like.

In embodiments, an anomaly is triggered based on a combination of signals surpassing a threshold or being out of the ordinary when compared to other, similar data signals. In some embodiments, a snapshot of the data, including the anomaly, is captured and stored in the cloud for the operator, data consumer, OEM, and data sharing platform owner to access and review (based on consents given by the owner)

allowing the anomaly to be reviewed within a dataset that also includes normal data. If a data consumer, OEM, and data sharing platform owner want access to the anomaly data, such an access request should be included in the consent forms discussed above.

Figure 13:
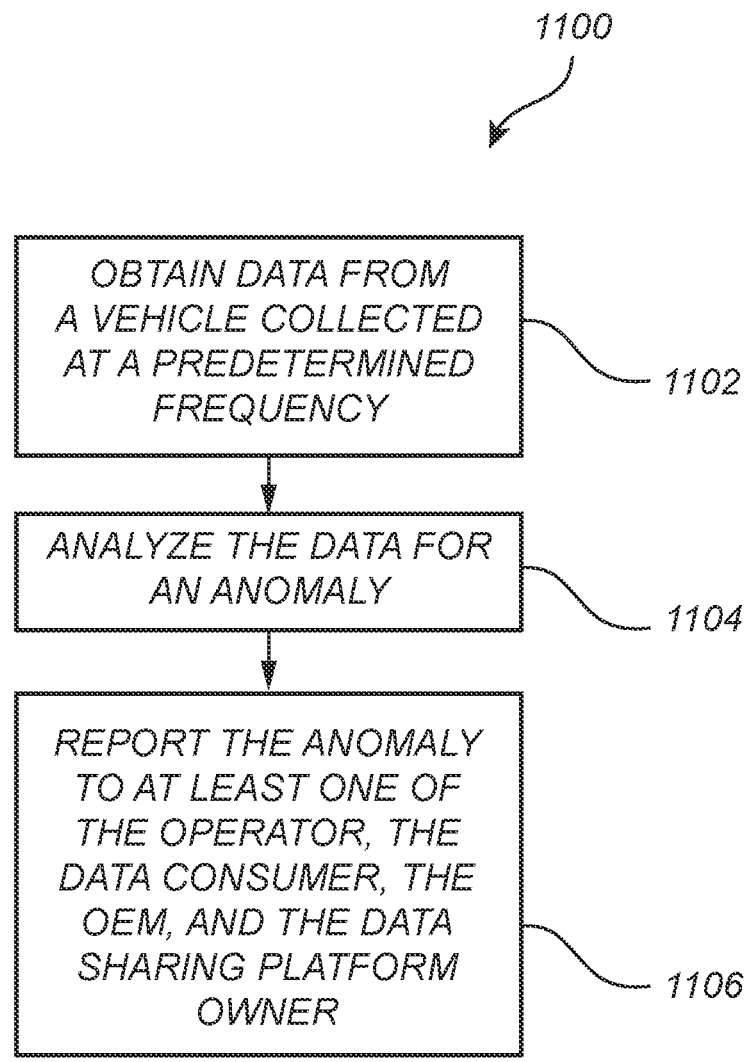
FIG. 13 is a further flowchart of one illustrative embodiment of a method for obtaining consent to access data collected from a vehicle in accordance with the present disclosure.

FIG. 13 is a flowchart of a method 1100 for detecting an anomaly in data obtained from a vehicle. The method 1100 includes obtaining data from a vehicle collected at a predetermined frequency at step 1102. The predetermined frequency is selected to ensure that observations of rare anomalies is possible and that such anomalies are not overlooked. The data can be obtained in real time as the data is collected or in batches of collected data.

The method 1100 also includes analyzing the data for an anomaly at step 1104. As noted above, analyzing the data can include one or more of comparing the data to predetermined threshold values, comparing the data to similar data obtained from other vehicles, comparing the data to test data associated with an anomaly, and the like. In embodiments, the data is analyzed for anomalies upon receiving a predetermined number of data points.

The method 1100 further includes reporting the anomaly to at least one of the operator, the data consumer, the OEM, and the data sharing platform owner at step 1106. In some embodiments, the method includes confirming that the data consumer, OEM, and the data sharing platform owner have obtained consent to access the data prior to reporting the anomaly thereto. In other embodiments, the method 1100 is initiated by a request from one of the operator, the data consumer, the OEM and the data sharing platform owner to detect the anomaly. In some embodiments, step 1106 includes sharing the underlying data with the at least one of the operator, the data consumer, the OEM, and the data sharing platform owner for further analysis thereof.

In one embodiment, activation of the hazard lights for a predetermined period is considered an anomaly. In this embodiment, the data is provided is provided publicly to provide hazard/safety information to other drivers. For example, the active hazard lights and a GPS location can be shared with navigation platforms that then provide the users of those platforms with a notification of where the vehicle is stopped with the hazard lights active.

As described above, a data consumer can request consent form an operator to access: data from one or more signals of data collected by the vehicle, a notification for and/or data associated with an anomaly, such as a car crash, and the like; an ability to send commands to the vehicle; and an ability to send operator interface (UI) notifications to the vehicle. In embodiments, the consent form can be pushed to the data sharing platform, such as via an API or can be uploaded to the data sharing platform via a data consumer UI/portal provided by the data sharing platform. Similarly, in embodiments, commands and UI notifications sent by the data consumer to the vehicle can be pushed via an API to the data sharing platform and ultimately to the vehicle. In embodiments, in response to an unavailability of the vehicle, the data sharing platform will cache the command and attempt to push the command a predetermined number of times before canceling the command due to inaccessibility of the vehicle. In some embodiments, the notification pushed to the vehicle includes a Uniform Resource Locator (URL) for the operator.

In embodiments, the data sharing platform is configured to push the data received from the vehicle to each of the data consumers with consent to receive the data. In embodiments, the pushed data also includes anomaly notifications and associated data. By so doing the data sharing platform does not need to store the vehicle data. Furthermore, scaling of the service merely requires obtaining a third party storage endpoint for each data consumer without the need to expand, manage, and maintain storage solutions.

In some embodiments, an owner, such as a rental car company, is also a data consumer. Such an owner utilizes the commands to configure/reconfigure the vehicle for a subsequent driver, such as the next renter of the vehicle. In particular, the owner pushes commands to set/reset vehicle features to a default. These features include setting a language of the vehicle to a default language, clearing wireless device connections, such as those made via Bluetooth, set climate controls to a default, set/reset radio presets, set navigation points in the vehicle navigation system, close windows, lock/unlock the vehicle, open the trunk, and the like. For example, in one embodiment, the data sharing platform is configured to push climate control commands to the vehicle. Upon renting a vehicle to a customer, a rental company can push a command to initiate the climate control of the vehicle to pre-condition the vehicle for the renter prior to the renter reaching the vehicle.

An owner as a data consumer may also monitor the safety and care being taken of the vehicle, such as by receiving a notification when certain conditions are met, such as a change in the tire pressure relative to a benchmark, safety features being disabled, seatbelts not being worn, and the like.

In some embodiments, an owner, such as a rental car company, utilizes push notifications to inform the driver of important information, such as a rental agreement, a mileage limit that is about to be reached, questions with regards to filing a claim (for an insurance company), and the like.

In some embodiments, an owner reports the vehicle as stolen and is able to push commands to the vehicle to aid in the recovery of the vehicle and provide data from the vehicle to law enforcement.

Ownership of the data obtained by the data sharing platform is one or more of the OEM, the owner of the car, and the driver of the car. As such, in embodiments, the data sharing platform is configured, not only to facilitate consent given by the owner/driver (operator), but also consent by the OEM. This allows OEMs to control the data being accessed from vehicles manufactured thereby.

In embodiments, the data sharing platform is configured to allow the OEM to accept or reject whether a data consumer can send consent forms to vehicles manufactured thereby; allow the OEM to revoke consents for a specific data consumer; control which data elements the data consumer can access; and which commands and notifications the data consumer can send to the vehicles manufactured thereby. As noted above, in embodiments, the OEM is also provided an ability to approve consents after such consents are obtained from and operator, approve consent forms before the consent forms are sent to the operator, receive notifications when a data consumer violates a policy or a consent is rejected for the data consumer not being known to the operator, and the like.

In embodiments, the data sharing platform utilizes the VIN of each car to determine the OEM in order to facilitate the above listed activities by the OEM.

Although the present disclosure is illustrated and described herein with reference to illustrative embodiments and specific examples thereof, it will be readily apparent to those of ordinary skill in the art that other illustrative embodiments and examples may perform similar functions and/or achieve like results. All such equivalent illustrative embodiments and examples are within the spirit and scope of the present disclosure, are contemplated thereby, and are intended to be covered by the following non-limiting claims for all purposes.

What is claimed is:

1. An automotive data sharing system, comprising:
a cloud system comprising a processor and a memory storing instructions that when executed by the processor cause the processor to:
receive a request from an entity for requested output data from a vehicle of a plurality of vehicles each coupled to the cloud system and running a same data collection application on a same operating system;
generate a consent form in response to the received request and based on the requested output data;
communicate the consent form to the vehicle via the data collection application;
receive an affirmative consent form response or a negative consent form response from the vehicle via the data collection application; and
in response to receiving the affirmative consent form response from the vehicle at the cloud system, receive input data from the vehicle at the cloud system and provide the input data from the vehicle to the entity through the cloud system as the requested output data via an application programming interface of the cloud system, wherein the input data received from the vehicle at the cloud system is limited by specific data elements of each of the request, the consent form, and the affirmative consent form response.

2. The automotive data sharing system of claim 1, wherein one or more of:
the cloud system is coupled to each of the plurality of vehicles via a wireless two-way communications link; and
the cloud system is coupled to the entity via a two-way communications link.

3. The automotive data sharing system of claim 1, wherein the cloud system is further configured to:
in response to receiving the negative consent form response from the vehicle at the data collection application, decline to receive the input data from the vehicle at the cloud system and decline to provide the input data from the vehicle to the entity through the cloud system as the requested output data via the application programming interface of the cloud system.

4. The automotive data sharing system of claim 1, wherein the affirmative consent form response further limits the input data received from the vehicle in terms of a duration limitation selected by an associated operator of the vehicle.

5. The automotive data sharing system of claim 1, wherein the affirmative consent form response includes a modified consent form response indicating approval to share modified output data including only a portion of the output data identified by the request received from the entity, and
wherein the cloud system is further configured to provide the modified output data to the entity further limited by specific data elements indicated by the modified consent form response.

6. The automotive data sharing system of claim 1, wherein the consent form is communicated to a user interface of a display of the vehicle via the data collection application, and the consent form response is received from the display of the vehicle.

7. The automotive data sharing system of claim 1, wherein the input data is encrypted by the vehicle utilizing the data collection application in response to a request for encryption by the entity and using a public key received from the entity through the cloud system, and the associated output data is subsequently decrypted by the entity using a corresponding private key.

8. The automotive data sharing system of claim 1, wherein the output data is provided at least one of periodically or when the input data indicates an event threshold has been satisfied and based on the request from the entity.

9. The automotive data sharing platform of claim 1, wherein the cloud system is configured to transmit one or more of a command, a push notification, and a web link from the entity to the vehicle.

10. The automotive data sharing system of claim 1, wherein the affirmative consent form response further limits the input data received from the vehicle in terms of a duration limitation selected by an associated operator of the vehicle, and
wherein the input data is encrypted by the vehicle utilizing the data collection application responsive to a request for encryption by the entity such that the input data is not readable by the cloud system.

11. The automotive data sharing system of claim 1, wherein the affirmative consent form response further limits the output data provided to the entity in terms of an approved entity approved to receive the output data and an approved stated purpose of the entity to receive the output data.

12. The automotive data sharing system of claim 1, wherein the cloud system is further configured to:
communicate from the entity, which has been given consent to access the output data, to the vehicle at least one of a command or user interface notification configured to selectively grant access to the entity to remotely control aspects of the vehicle, to facilitate a two-way communication between the entity and the vehicle, or both.

13. The automotive data sharing system of claim 1, wherein the cloud system is further configured to receive at least one vehicle identification number (VIN) from the entity identifying the vehicle of the plurality of vehicles.

14. The automotive data sharing system of claim 1, wherein the cloud system is further configured to:
communicate the consent form request to an original equipment manufacturer (OEM) of the vehicle of the plurality of vehicles;
receive approval of the OEM;
wherein the output data is provided to the entity in response to receiving approval of the entity from the OEM.

15. The automotive data sharing system of claim 1, wherein the request and the consent form each include at least one of a web link or a universal resource locator from the entity, and wherein the consent form is configured to, while being acted upon by the vehicle, display content associated with at least one of the web link or the universal resource locator to an associated operator of the vehicle.

16. The automotive data sharing system of claim 1, wherein the vehicle is configured to generate the input data by compressing vehicle data via the data collection application.

17. An automotive consent management method, comprising, in a cloud system:
receiving a consent form request from an entity identifying requested output data from a vehicle of a plurality of vehicles each coupled to the cloud system and running a same data collection application on a same operating system;

generating a consent form responsive to the received consent form request and based on the requested output data;

sending the consent form to the vehicle via the data collection application;

receiving an affirmative consent form response or a negative consent form response from the vehicle via the data collection application;

in response to receiving the affirmative consent form response from the vehicle at the cloud system, receiving input data from the vehicle at the cloud system and providing the input data from the vehicle to the entity through the cloud system as the requested output data via an application programming interface of the cloud system, wherein the input data received from the vehicle at the cloud system is limited by specific data elements of each of the request, the consent form, and the affirmative consent form response; and in response to receiving the negative consent form response from the vehicle at the data collection application, declining to receive the input data from the vehicle at the cloud system and declining to provide the input data from the vehicle to the entity through the cloud system as the requested output data via the application programming interface of the cloud system.

18. The automotive consent management method of claim 17, wherein the cloud system comprises a processor and a memory.

19. A non-transitory computer-readable medium stored as instructions in a memory executed by a processor of a cloud system to cause the processor to:

receive a consent form request from an entity identifying output data from a vehicle of a plurality of vehicles each coupled to the cloud system and running a same data collection application on a same operating system;

generate a consent form responsive to the received consent form request and based on the output data;

send the consent form to the vehicle via the data collection application;

receive an affirmative consent form response or a negative consent form response from the vehicle via the data collection application;

in response to receiving the affirmative consent form response from the vehicle at the cloud system, receive input data from the vehicle at the cloud system and provide the input data from the vehicle to the entity through the cloud system as the requested output data via an application programming interface of the cloud system, wherein the input data received from the vehicle at the cloud system is limited by specific data elements of each of the request, the consent form, and the affirmative consent form response; and in response to receiving the negative consent form response from the vehicle at the data collection application, decline to receive the input data from the vehicle at the cloud system and decline to provide the input data from the vehicle to the entity through the cloud system as the requested output data via the application programming interface of the cloud system.

\* \* \* \* \*